(12) United States Patent
Copenhaver (10) Patent No.: US 8,783,689 B1
(45) Date of Patent: Jul. 22, 2014

(54) STEER ROPING PRACTICE APPARATUS WITH ENHANCED LEG ROPING SIMULATION

(76) Inventor: Alan R. Copenhaver, Hinton, IA (US)

(*) Notice: Subject to any disclaimer, the term of this patent is extended or adjusted under 35 U.S.C. 154(b) by 343 days.

(21) Appl. No.: 13/345,275

(22) Filed: Jan. 6, 2012

(51) Int. Cl.
*A63B 69/00* (2006.01)
*A01K 15/02* (2006.01)

(52) U.S. Cl.
USPC ............................................ 273/359; 119/839

(58) Field of Classification Search
USPC .......... 273/359, 336, 367, 338, 339; 119/839; 434/267, 258, 219, 225
See application file for complete search history.

(56) References Cited

U.S. PATENT DOCUMENTS

| | | | |
|---|---|---|---|
| 3,066,939 A | 12/1962 | Sprout | |
| 4,266,779 A | 5/1981 | English | |
| 4,364,570 A | 12/1982 | Hallam | |
| 4,451,045 A * | 5/1984 | Fesmire | 273/338 |
| 4,662,642 A * | 5/1987 | Archibald et al. | 273/339 |
| 4,874,179 A * | 10/1989 | Henderson | 273/338 |
| 4,981,302 A * | 1/1991 | Narramore | 273/339 |
| 4,995,618 A * | 2/1991 | Panzner | 273/367 |
| 5,709,386 A * | 1/1998 | Nelson | 273/370 |
| 6,497,411 B1 | 12/2002 | Nelson | |
| 6,736,399 B1 * | 5/2004 | Copenhaver | 273/339 |
| 6,945,534 B1 * | 9/2005 | Lindsey | 273/359 |
| 7,059,605 B1 * | 6/2006 | Hughes | 273/369 |
| 7,293,775 B1 * | 11/2007 | Donnelly | 273/359 |
| 7,430,990 B1 * | 10/2008 | Copenhaver | 119/839 |
| 8,297,980 B2 * | 10/2012 | Reynolds | 434/225 |
| 2004/0101811 A1 | 5/2004 | Gipson | |
| 2006/0170163 A1 * | 8/2006 | Perkins | 273/359 |

* cited by examiner

*Primary Examiner* — Raleigh W Chiu
(74) *Attorney, Agent, or Firm* — Jeffrey A. Proehl; Woods, Fuller, Shultz & Smith, P.C.

(57) ABSTRACT

A mechanical roping steer apparatus for practicing roping of a steer may comprise a steer assembly having a front and a rear. The steer assembly may comprise a frame and a leg assembly mounted on the frame and including at least one leg member being movable with respect to the frame, the at least one leg member having a lower end movable along an arc. The steer apparatus may further comprise an actuation assembly configured to engage a ground surface below the steer assembly and move the at least one leg member when the steer assembly is moved across the ground surface. The steer apparatus may also comprise a rope deflection assembly configured to deflect a rope from looping about the at least one leg member for at least a forward portion of the arc of movement of the leg lower end.

18 Claims, 8 Drawing Sheets

STEER ROPING PRACTICE APPARATUS WITH ENHANCED LEG ROPING SIMULATION

BACKGROUND

1. Field

The present disclosure relates to steer roping practice apparatus and more particularly pertains to a new steer roping practice apparatus with enhanced leg roping simulation to facilitate more accurate roping technique by the user.

2. Description of the Prior Art

Steer roping practice apparatus are generally known in the art, and highly useful practice apparatus are disclosed in my U.S. Pat. No. 6,736,399 and my U.S. Pat. No. 7,430,990, each of which is hereby incorporated by reference in their respective entireties. While these apparatus have significant advantages, the applicant has recognized improvements that can further enhance the realism of the steer roping simulation provided by such apparatus.

SUMMARY

The present disclosure describes a new steer roping practice apparatus with enhanced leg roping simulation that may reduce the roper's ability to rope the leg of the apparatus at portions of the leg movement that are not the preferred positions for roping the leg.

In some aspects, the present disclosure relates to a mechanical roping steer apparatus for practicing roping of a steer that comprises a steer assembly having a front and a rear. The steer assembly may comprise a frame and a leg assembly mounted on the frame and including at least one leg member being movable with respect to the frame, the at least one leg member having a lower end movable along an arc. The steer assembly may also comprise an actuation assembly configured to engage a ground surface below the steer assembly and move the at least one leg member when the steer assembly is moved across the ground surface, and a rope deflection assembly configured to deflect a rope from looping about the at least one leg member for at least a forward portion of the arc of movement of the leg lower end.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 8 thereof, a new steer roping practice apparatus with enhanced leg roping simulation embodying the principles and concepts of the disclosed subject matter will be described.

The applicant has recognized that, with respect to known steer roping practice apparatus, the legs of the practice apparatus may be roped or lassoed when the leg or legs are moving along a forward portion of the arc of movement of the lower ends of the legs. Even though it may be possible to do so, roping the hind legs at the forward portion of the gait of the steer is not considered to be good roping technique. While it may be visually recognized by observers that the legs were roped at the forward portion of the gait, the incorrect technique may in this way be encouraged or rewarded since the final result—roping the hind legs—may be the same. This problem may be exacerbated in roping practice apparatus in which the structure simulating the steer's hind legs do not make contact with the ground surface below the practice apparatus, as this presents another portion of the gait at which the legs can be roped but again is considered to be bad technique.

Figure 1:
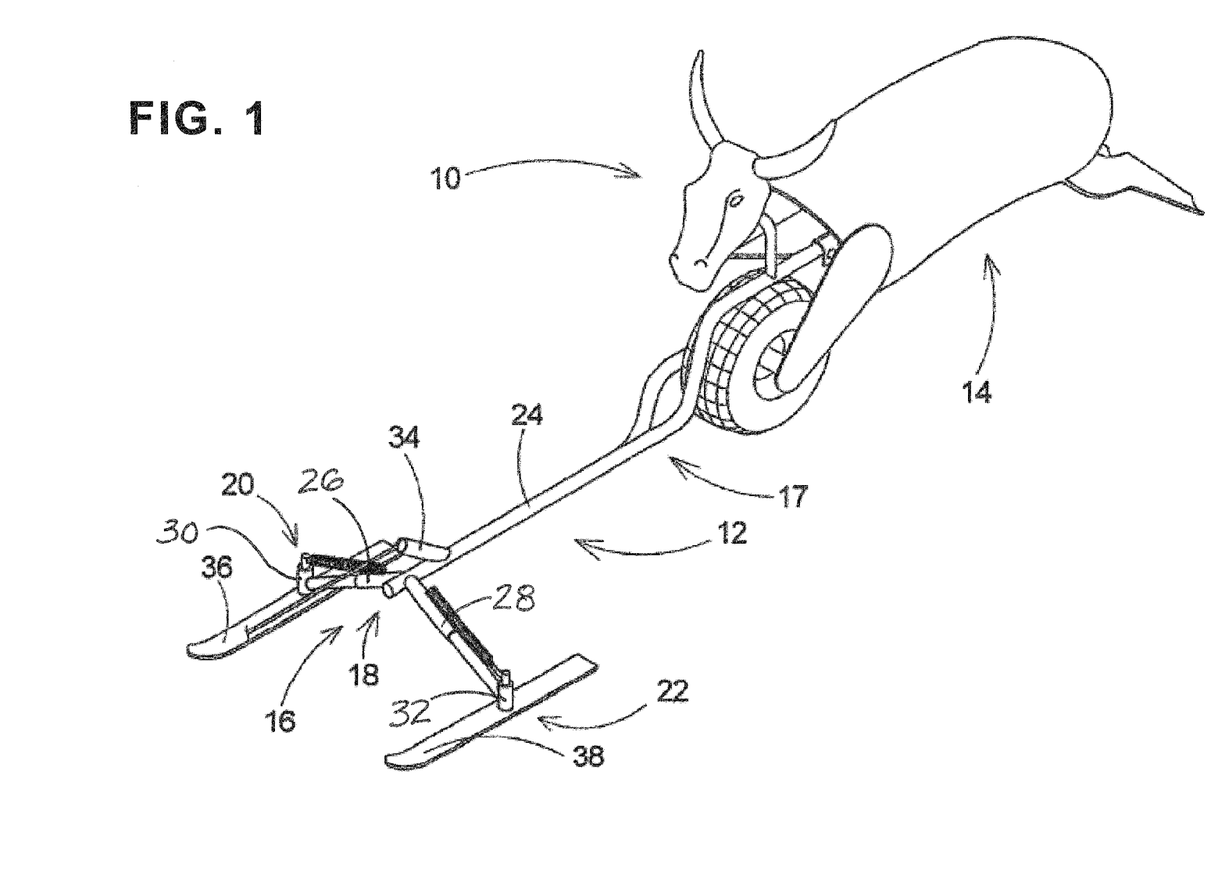
FIG. 1 is a schematic perspective view of a new mechanical roping steer apparatus according to the present disclosure.

The disclosure relates to a mechanical roping steer apparatus 10 of the invention includes a forward support assembly 12 for engaging a ground surface and a rearward steer assembly 14 located rearwardly of the support assembly.

In greater detail, the support assembly 12 has a front 16 and a rear 17, and comprises a main frame 18 and a pair of lateral skids 20, 22 that are mounted on the main frame for contacting the ground surface. The main frame 18 has a forward end toward the front 16 of the support apparatus 12 and a rearward end toward the rear of the support apparatus. The main frame 18 may include a substantially central longitudinal member 24 extending between the forward and rearward ends of the main frame, and may comprise a bar or tube, for example.

The main frame 18 may further include a pair of skid support members 26, 28 for supporting the lateral skids 20, 22. Each of the skid support members 26, 28 may extend laterally outward from the longitudinal member 24 in substantially opposite directions. Each skid support member 26, 28 may have a length that is adjustable to thereby adjust a lateral separation of the lateral skids 20, 22, and may include at least two portions which may be telescopically mounted together to permit a first one of the portions to extend and retract with respect to a second one of the portions. Each of the skid support members 26, 28 may extend downwardly and outwardly from the longitudinal member 24 such that the skid support members are inclined with respect to the ground surface.

Still further, the main frame 18 may include a pair of skid mounting members 30, 32 each mounted on an outboard end of one of the skid support members 26, 28. Each of the skid mounting members 30, 32 may be configured to permit pivoting of the respective skid 20, 22 with respect to the main frame 18.

A tow attachment member 34 may be included as part of the main frame 18 for attaching to a towing cord, and may extend generally upwardly, and optionally forwardly, from the longitudinal member 24. The tow attachment member 34 may be mounted at a medial position on the longitudinal member 24 located rearwardly of the skid support members 26, 28. Each of the lateral skids 20, 22 may include a skid member 36, 38 with a forward end and a rearward end. The skids 20, 22 may be substantially freely pivotable with respect to the skid mounting member, such as is described in my U.S. Pat. No. 7,430,990.

Figure 2:
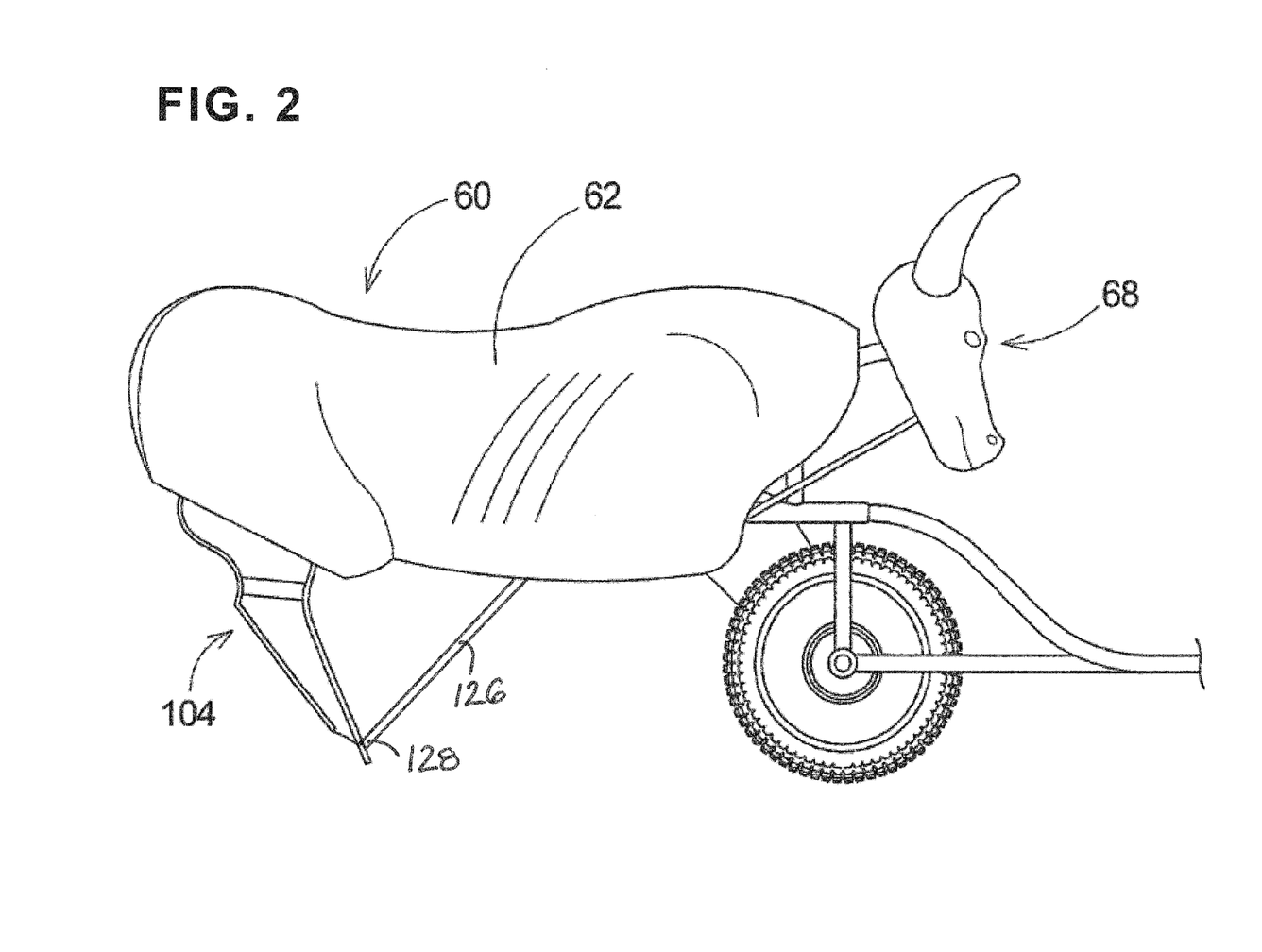
FIG. 2 is a schematic side view of the steer assembly of the present invention.

The steer assembly 14, which is mounted on the rear of the support assembly 12 and has a front 40 and a rear 42, may include a frame 50. The frame 50 may comprise a spine member 52 that extends from the forward end to the rearward end of the frame 50. In some embodiments, the spine member 52 is substantially horizontally oriented. The frame 50 may also include a head support member 54 that is mounted on the spine member 52, and extends generally upwardly from the spine member. The head support member 54 may be located toward the forward end of the frame, and may extend generally upwardly and forwardly from the spine member. The frame 50 may also include a wheel support member 56 that is mounted on the spine member 52, and may extend downwardly from the spine member at a location toward the forward end of the frame. An axle 58 may be mounted on the wheel support member 56 so that the axle is located below the spine member 52.

The steer assembly 14 may further include a body covering assembly 60 for providing a realistic appearance, as well as realistic movement, to the steer assembly. The body covering assembly 60 may comprise a body covering 62 for covering at least a portion of the frame 50. The body covering 62 may have an outer surface that is contoured to resemble the body of a calf. The body covering 62 may form an inner cavity, and is preferably formed of a flexible material. The body covering 62 may include, for example, a portion that resembles the back of the body of the steer, and well as the sides of the body of the steer. A body support member 64 may be provided as part of the steer assembly 14 to support the body covering 62 on the frame, and the body covering 62 may be mounted on the body support member. The body support member 64 may be positioned in the inner cavity of the body covering. The body support member 64 may be mounted on the spine member 52, and may be pivotable with respect to the spine member to move the body covering 62 with respect to the spine member. The body covering assembly 60 may further include an elevating member 66 mounted on the spine member and extending upwardly from the spine member. The body support member 64 is pivotally mounted on the elevating member 66. The body support member 64 pivots on the elevating member 66 along an axis that is oriented perpendicular to the longitudinal axis of the frame, to thereby raise the hindquarters region of the body covering 62 upwardly and downwardly with respect to, for example, the shoulder region of the body covering 62. A head assembly 68 may be mounted on the frame in a pivotable manner, such as is described in my U.S. Pat. No. 7,430,990 to cause the head form 72 to pivot.

Figure 3:
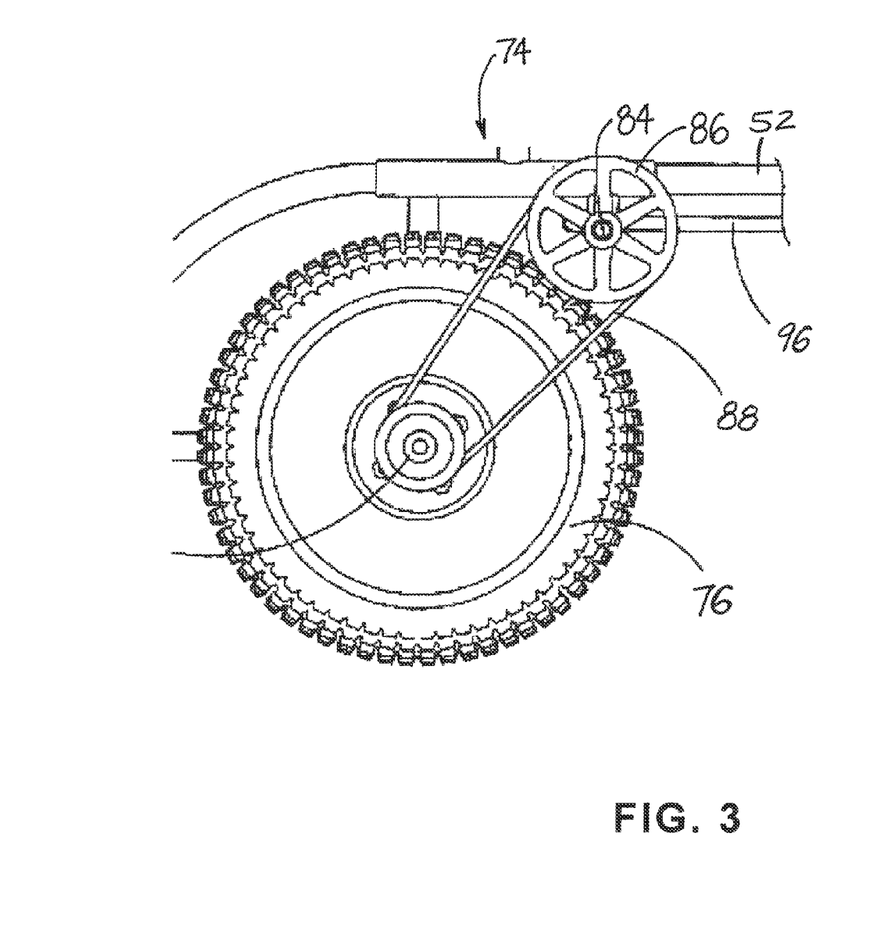
FIG. 3 is a schematic side view of a portion of the steer assembly showing elements of the actuation assembly.

The steer assembly 14 further includes an actuation assembly 74 for transferring movement from the ground surface to moveable elements of the steer assembly including, for example, the body covering assembly 60 and the head assembly 68 to cause the body covering assembly and the head assembly to pivot in a cyclical manner that is responsive to the speed of movement of the support assembly and steer assembly across the ground surface. The speed of the movement of the actuation assembly, the body covering assembly, and the head assembly thus increases as the speed of movement of the invention across the ground surface increases, and decreases as the speed of movement of the invention across the ground surface decreases. The actuation assembly 74 may comprise a wheel 76 for being rotated by the ground surface as the support assembly 12 is moved along the ground surface.

Figure 4:
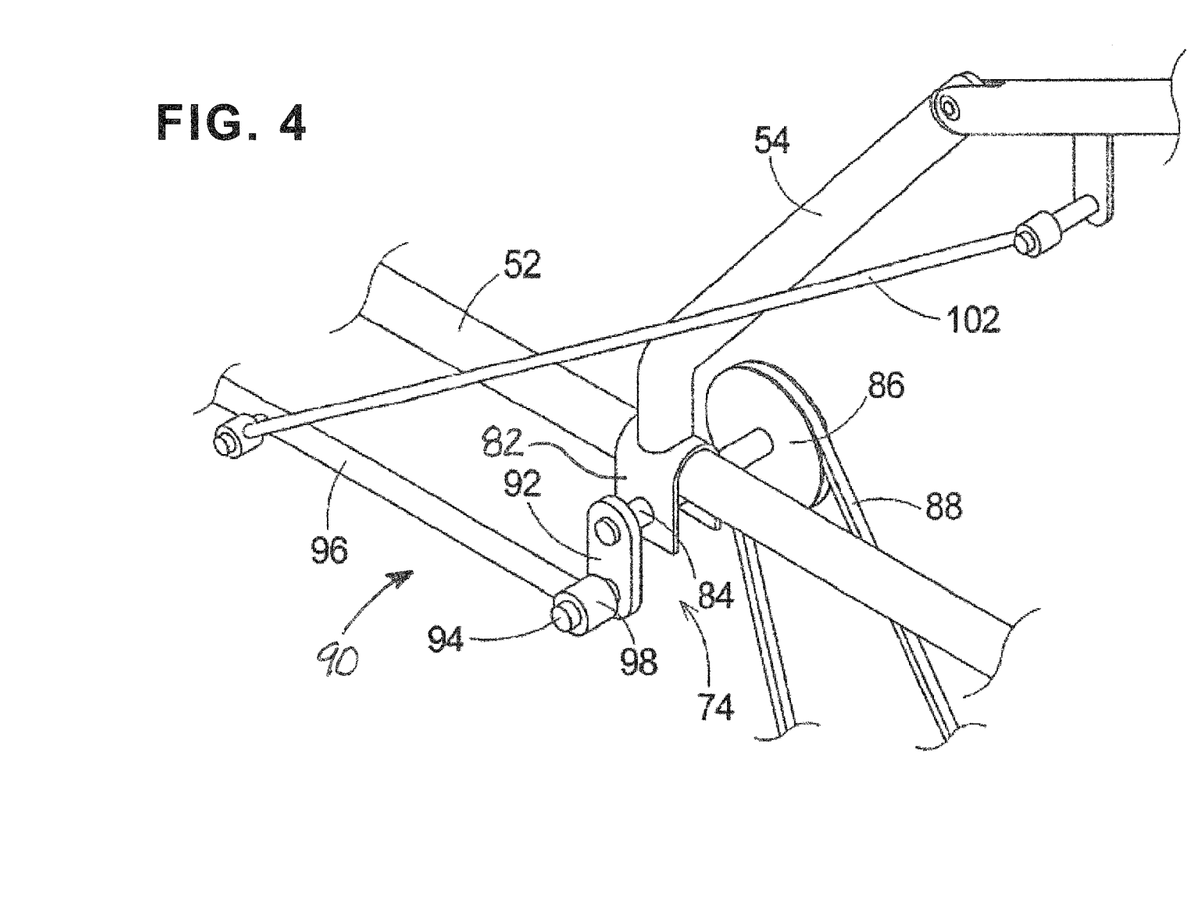
FIG. 4 is a schematic perspective view of a portion of the steer assembly with the body cladding removed to reveal detail of the transferring assembly of the actuation assembly.

The actuation assembly 74 may include a transferring assembly 78 that is configured to transfer movement of the wheel 76 to various movable elements of the steer assembly 14, and may be used to cause these elements to move or pivot in a cyclical manner that corresponds to the speed of movement of the steer assembly 14 over the ground surface and, as a result, the speed at which the wheel rotates. Illustratively, the transferring assembly 78 may comprise a pulley assembly with a driver pulley mounted on the axle 58 of the frame for rotation with the wheel, a pulley axle support 82 mounted on the frame, a pulley axle 84 rotatably mounted on the pulley axle support, and a driven pulley 86 mounted on the frame. The pulley assembly may further include a belt 88 that rotatably connects the driver pulley to the driven pulley 86.

The transferring assembly 78 may further comprise a reciprocating assembly 90 for converting the rotational movement of the pulley axle 84 to a generally reciprocating motion. The reciprocating assembly 90 may comprise an offset plate 92 that is mounted on the pulley axle 84 for rotating the offset plate upon rotation of the pulley axle, and that extends radially outward from a longitudinal axis of the pulley axle. The reciprocating assembly 90 may further include a first stub shaft 94 that is mounted on the offset plate 92 such that a longitudinal axis of the first stub shaft is offset from the longitudinal axis of the pulley axle. The reciprocating assembly 90 also includes an elongate transfer member 96 that has a first end sleeve 98 that is rotatably mounted on the first stub shaft 94. As will be recognized by those skilled in the art, the faster that the wheel is rotated, the faster that the transfer member 96 is reciprocated by the transferring assembly 78, and the slower that the wheel is rotated, the slower that the transfer member 96 is reciprocated by the transferring assembly 78.

The actuation assembly 74 may further include structure for transferring movement of the reciprocating assembly 90 to the body covering assembly 60, such that reciprocating movement of the reciprocating assembly causes movement of the body covering assembly 60. The body movement structure is described in greater detail in my U.S. Pat. No. 7,430, 990 and is incorporated by reference.

The actuation assembly 74 may further include structure for transferring movement of the reciprocating assembly 90 to the head assembly 68, such as using a head actuating member 102. The head actuating member 102 may be connected to the reciprocating assembly 90 and the head assembly 68 such that reciprocating movement of the reciprocating assembly causes pivoting of the head assembly 68. The head movement structure is described in greater detail in my U.S. Pat. No. 7,430,990 and is incorporated by reference.

Figure 5:
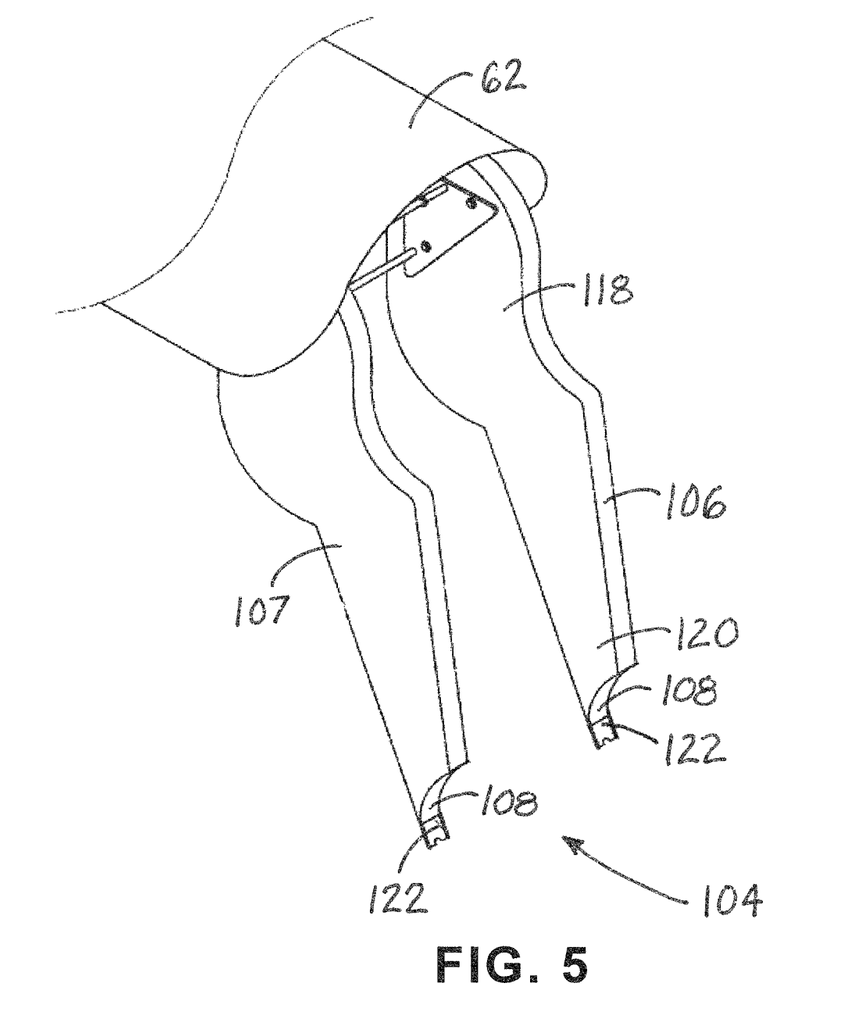
FIG. 5 is a schematic perspective view of the leg assembly of the steer assembly.

The steer assembly 14 may also include a leg assembly 104 that includes at least one leg member 106, and in the most preferred embodiments includes a pair of leg members 106, 107 that are laterally spaced from each other. The one or more leg members 106, 107 may be moveable with respect to the frame 50 of the steer assembly, as well as with respect to the ground surface. The leg members 106, 107 may move in substantial unison with each other. The leg members 106, 107 may be movable in a generally pivotal manner such that lower ends 108 of the leg members move substantially along an arc 110 between a forward position (see FIG. 6) and a rearward position (see FIG. 7). The arc 110 of the leg lower end movement may lie in a plane that is oriented generally perpendicular to the ground surface, and may be substantially parallel to the axis of the spine member 52. The plane of the arc 110 may extend generally forwardly and rearwardly, and the arc 110 of leg lower end movement may have a forward portion 112 located toward the front 40 of the steer assembly, and a rearward portion 114 located toward the rear 42 of the steer assembly, and a middle portion 116 between the forward 112 and rearward 114 portions.

The leg member or members may be configured to contact the ground surface along at least a portion of the middle portion 116 of the arc 110 of leg lower end movement. Each of the leg members 106, 107 may have an upper portion 118 and a lower portion 120 with the lower end 108. Each of the leg members 106, 107 may include a foot extension member 122 that extends from the lower end 108 of each of the leg members for contacting the ground surface during at least a portion of the middle portion 116 of the arc 110 of the leg lower end movement of the leg members. The foot extension member 122 may be flexible to permit some flexion when the foot extension member contacts the ground surface. The leg assembly 104 may be actuated by the actuation assembly 74 to move pivotally at a speed that corresponds to the speed of movement across the ground surface. A highly suitable structure for accomplishing this is described in my U.S. Pat. No. 6,736,399.

Figure 6:
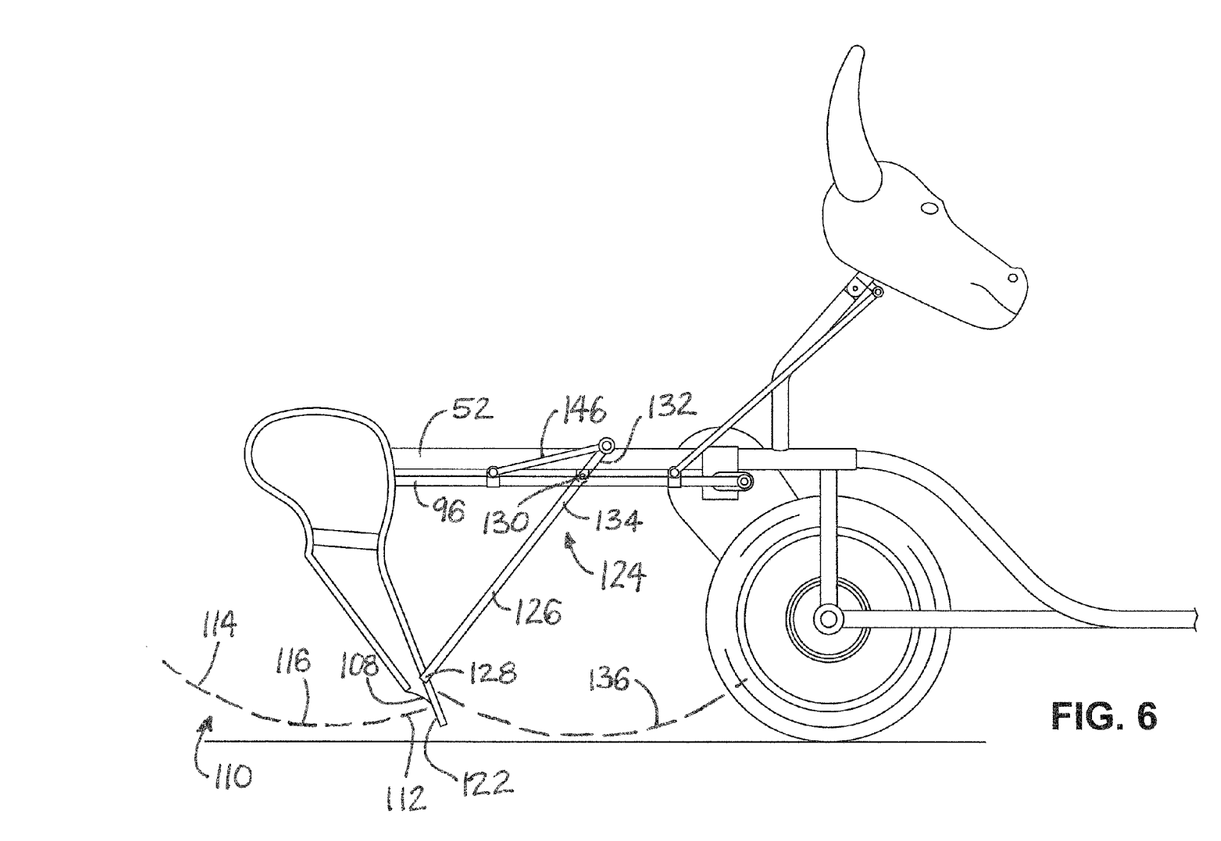
FIG. 6 is a schematic side view of the steer assembly with the body covering removed to reveal detail of the actuation assembly and the rope deflection assembly, with the leg member being in a substantially forward position and the deflection member being in a rearward deflecting position.
Figure 7:
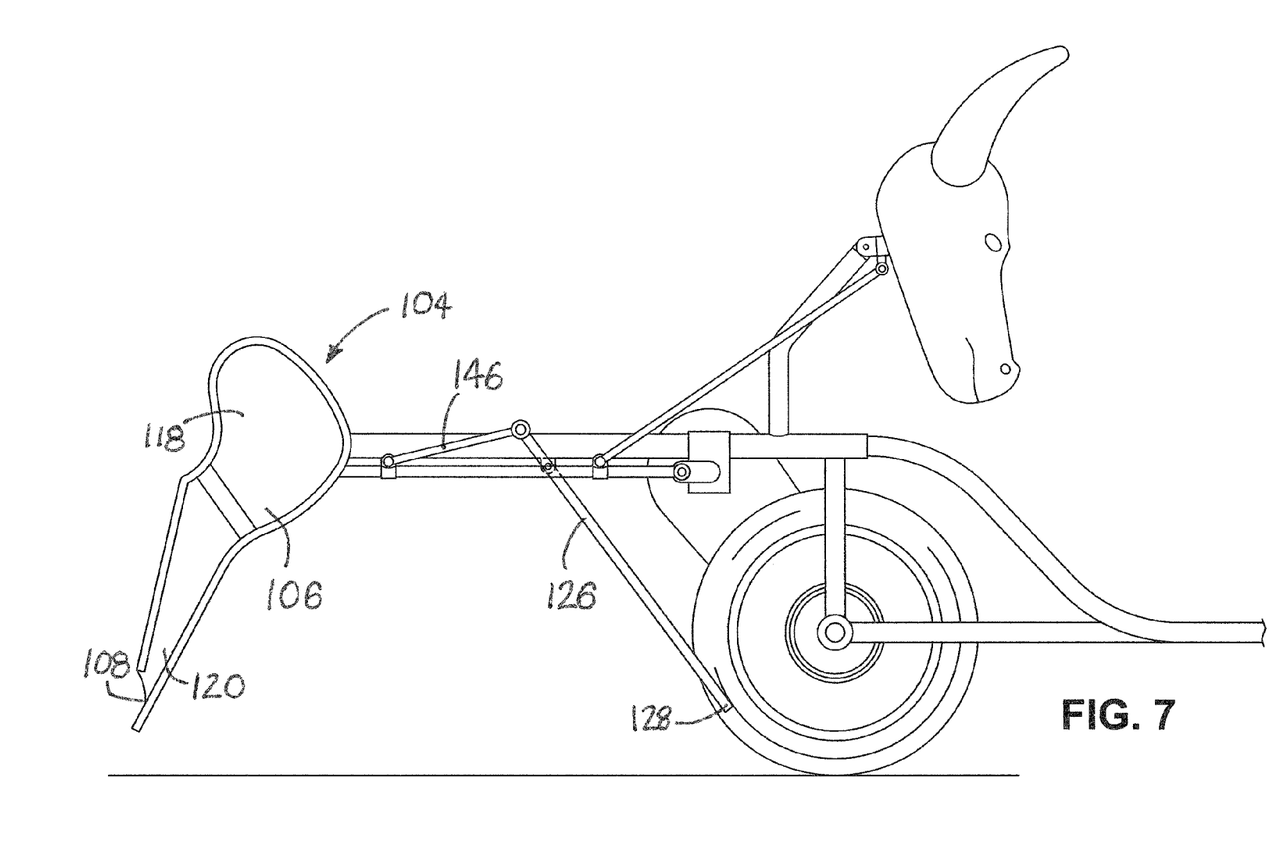
FIG. 7 is a schematic side view of the steer assembly with the body covering removed to reveal detail of the actuation assembly being in a substantially rearward position and the deflection member being in a forward non-deflecting position.

The steer assembly 14 may further comprise a rope deflection assembly 124 configured to deflect a rope from looping about the leg member 106, 107 for at least a portion of the arc 110 of leg lower end movement. The rope deflection assembly 124 may comprise an elongate deflection member 126 that may extend downwardly to a tip 128 of the member 126. The deflection member 126 may be mounted on the frame 50 and may be movable with respect to the frame 50. In some of the most preferred embodiments, the deflection member 126 may be pivotally mounted on the frame such that the movement of the member 126 causes the tip 128 to define a curved path, such as an arc. The deflection member 126 may be positioned forwardly of the leg assembly, and may be mounted on the frame forwardly of the leg assembly.

The deflection member 126 may be mounted on the frame 50 at a pivot location 130 on the member 126, and the pivot location may be located between an upper portion 132 of the deflection member and a lower portion 134 of the deflection member. The deflection member 126 may have a swing path extending forwardly and rearwardly, and lying in a plane oriented substantially parallel to the plane of the arc 110 of the leg lower end movement. The tip of the deflection member moves along a swing arc 136 which may intersect with a portion of the arc 110 of the leg lower end movement. The swing path of the deflection member may thus overlap with the sweep of the one of the leg members to provide a portion of the forward portion 112 of the arc of movement of the leg member. When the swing of the deflection member overlaps the swing of the leg member, a loop of rope thrown at the leg members may be deflected from being looped about one or both of the leg members, or may be pushed off of the leg member, by the deflection member as the deflection member moves.

Figure 8:
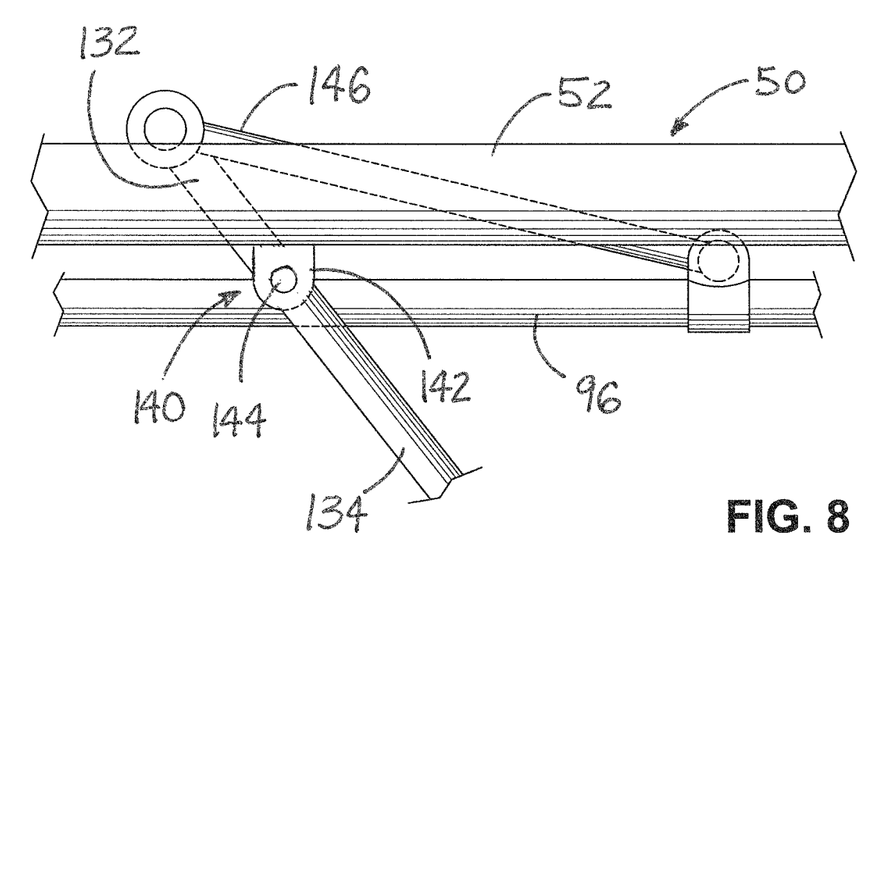
FIG. 8 is a schematic side view of portions of the actuation assembly and the rope deflection assembly from a vantage point opposite of the views in FIGS. 6 and 7.

In some of the most preferred embodiments, the plane of the swing arc 136 of the deflection member 126 is located laterally outward from the plane of the arc 110 of the leg lower end movement, which enhances the capability of the deflection member to keep the rope loop from encircling one of the leg members. In some embodiments, the swing arc 136 of the deflection member may be positioned laterally outward on the right side of the arc 110 of the leg member to better intercept rope loops approaching the leg members from the right hand side as thrown by a right-handed user.

Preferably, but not necessarily, a section of the lower portion of the deflection member is flexible to permit resilient bending of the section of the lower portion 134 of the deflection member, which can facilitate release of the rope from the deflection member should the rope become looped around the deflection member, even as the deflection member moves forwardly away from the roper. The material employed to form the flexible section may preferably have sufficient rigidity to maintain the normal shape and configuration of the deflection member when the member is swung forward and rearward.

The rope deflection assembly 124 may also include a pivot mounting 140 that connects the deflection member 126 to the frame 50 in a manner permitting pivot movement of the deflection member with respect to the frame. The pivot mounting 140 may be located at the pivot location 130 on the deflection member, so that the upper and lower portions of the member 126 pivot about the pivot location. In some illustrative embodiments, the pivot mounting 140 may comprise a pivot sleeve 142 mounted on the frame 50, and a pivot shaft 144 that is mounted on the deflection member 126 and extends into the pivot sleeve so that the pivot shaft is able to rotate with respect to the pivot sleeve, and thus the deflection member with respect to the frame. The pivot shaft may be rotatable about a substantially horizontal axis, so that the deflection member swings in a substantially vertical plane, although this orientation is not critical.

The rope deflection assembly 124 may also comprise a connecting member 146 that connects the deflection member 126 to the actuation assembly 74. The connecting member 146 may be pivotally connected to the transfer member 96 of the actuation assembly 74 and to the deflection member 126. The connecting member 146 may be connected to the deflection member 126 at a location on the upper portion 132 of the deflection member that is opposite of the tip 128 with respect to the pivot location 140 so that movement of the lower portion 134 (and the tip 128) of the deflection member is generally in a direction opposite of the movement of the leg members 106, 107. The length of the connecting member 146 may be adjustable to adjust a distance between a location of the connection to the transfer member 96 and a location of the connection to the deflection member 126 to permit adjustment of the swing arc 136 of the deflection member.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A mechanical roping steer apparatus for practicing roping of a steer, the apparatus comprising:
    a steer assembly having a front and a rear, the steer assembly comprising:
        a frame;
        a leg assembly mounted on the frame and including at least one leg member being movable with respect to the frame, the at least one leg member having a lower end movable along an arc;
        an actuation assembly configured to engage a ground surface below the steer assembly and move the at least one leg member when the steer assembly is moved across the ground surface; and
        a rope deflection assembly configured to deflect a rope from looping about the at least one leg member for at least a forward portion of the arc of movement of the leg lower end.

2. The apparatus of claim 1 wherein the leg assembly is configured such that the lower end of the at least one leg contacts the ground surface for at least a portion of the arc of movement of the leg lower end in a manner that prevents a rope from looping about the at least one leg member.

3. The apparatus of claim 2 wherein the portion of the arc of movement in which the leg lower end contacts the ground surface is located rearward of the forward portion of the arc in which the rope deflection assembly deflects a rope from looping about the at least one leg member.

4. The apparatus of claim 2 wherein the leg assembly includes a foot extension member extending from the lower end of the at least one leg member for contacting the ground surface during at least a portion of the generally pivotal movement of the leg members.

5. The apparatus of claim 1 wherein the rope deflection assembly comprises an elongate deflection member mounted on the frame and being movable with respect to the frame, the deflection member extending downwardly from the frame to a tip movable in a swing arc.

6. The apparatus of claim 5 wherein a rearward portion of the swing arc of the tip of the deflection member overlaps with the forward portion of the arc of movement of the leg lower end of the at least one leg member.

7. The apparatus of claim 5 wherein a plane of the swing arc of the tip of the deflection member is located laterally outward from a plane of the arc of movement of the leg lower end of the at least one leg member.

8. The apparatus of claim 5 wherein the deflection member is pivotally mounted on the frame at a location forward of the leg assembly.

9. The apparatus of claim 5 wherein the rope deflection assembly is movable by the actuation assembly.

10. The apparatus of claim 5 wherein the rope deflection assembly comprises a connecting member connecting the deflection member to the actuation assembly, an effective length of the connecting member being adjustable to adjust a length of the swing arc of the tip of the deflection member.

11. The apparatus of claim 5 wherein a plane of the swing arc of the tip of the deflection member is oriented generally perpendicular to the ground surface.

12. The apparatus of claim 1 wherein a section of the deflection member is flexible to permit resilient bending of the section of the deflection member.

13. The apparatus of claim 1 wherein the actuation assembly moves the at least one leg member and the deflection member with respect to the frame at a speed that varies corresponding to a speed of movement of the steer assembly across the ground surface.

14. The apparatus of claim 1 wherein the deflection member has a swing path lying in a plane oriented substantially parallel to a plane of the arc of movement of the leg lower end.

15. The apparatus of claim 1 wherein the actuation assembly includes:
    a wheel rotatably mounted on the frame for contacting the ground surface; and
    a linkage connecting the wheel to the leg assembly such that rotation of the wheel by the ground surface when the steer assembly is moved over the ground surface is transferred to the leg assembly to pivot the at least one leg member.

16. The apparatus of claim 15 wherein the rope deflection assembly comprises a deflection member and a connecting member connecting the deflection member to the linkage of the actuation assembly.

17. The apparatus of claim 1 additionally comprising a support assembly for resting on a ground surface, the steer assembly being mounted on and extending rearwardly from the support assembly.

18. The apparatus of claim 17 wherein the support assembly comprises a base portion and a pair of lateral skid portions for contacting the ground surface, the lateral skid portions positioned laterally in relation to the base portion, each of the lateral skid portions including a skid member extending forwardly and rearwardly.

* * * * *